United States Patent
Lee et al.

(10) Patent No.: US 11,423,674 B2
(45) Date of Patent: Aug. 23, 2022

(54) VEHICLE OCCUPANT GAZE DETECTION

(71) Applicant: Ford Global Technologies, LLC, Dearborn, MI (US)

(72) Inventors: Kyoung Min Lee, Ypsilanti, MI (US); Parthasarathy Subburaj, Chennai/Tamil Nadu (IN); Durga Priya Kumar, Gummidipoondi/Tamil Nadu (IN); Tilak D, Bangalore/Karnataka (IN)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 96 days.

(21) Appl. No.: 17/077,396

(22) Filed: Oct. 22, 2020

(65) Prior Publication Data
US 2022/0129686 A1  Apr. 28, 2022

(51) Int. Cl.
| G06V 20/59 | (2022.01) |
| G06T 7/73 | (2017.01) |
| B60W 60/00 | (2020.01) |
| B60W 40/08 | (2012.01) |
| G06V 40/16 | (2022.01) |

(52) U.S. Cl.
CPC .......... *G06V 20/597* (2022.01); *B60W 40/08* (2013.01); *B60W 60/0051* (2020.02); *B60W 60/0059* (2020.02); *G06T 7/73* (2017.01); *G06V 40/171* (2022.01); *B60W 2420/42* (2013.01); *B60W 2540/225* (2020.02); *G06T 2207/20076* (2013.01); *G06T 2207/20081* (2013.01); *G06T 2207/30201* (2013.01); *G06T 2207/30268* (2013.01)

(58) Field of Classification Search
USPC .......................................................... 382/104
See application file for complete search history.

(56) References Cited

U.S. PATENT DOCUMENTS

| 6,496,117 | B2 | 12/2002 | Gutta et al. |
| 9,248,796 | B2 * | 2/2016 | Takahashi .......... G01C 21/3602 |
| 9,405,982 | B2 | 8/2016 | Zhang et al. |
| 9,460,601 | B2 | 10/2016 | Mimar |
| 9,547,798 | B2 | 1/2017 | Plummer et al. |

(Continued)

FOREIGN PATENT DOCUMENTS

| CN | 110728256 A | 1/2020 |
| WO | 2020122986 A1 | 6/2020 |

OTHER PUBLICATIONS

Fridman et al., Driver Gaze Estimation Without Using Eye Movement, This manuscript was submitted to IEEE Intelligent Systems on Jun. 5, 2015, arXiv:1507.04760v1 [cs.CV] Jul. 16, 2015.

(Continued)

*Primary Examiner* — Jerome Grant, II
(74) *Attorney, Agent, or Firm* — Frank A. MacKenzie; Bejin Bieneman PLC

(57) ABSTRACT

A computer includes a processor and a memory, the memory storing instructions executable by the processor to determine respective probabilities of a direction of a gaze of a vehicle occupant toward each of a plurality of points in an image, determine a gaze distance from a center of the image based on the probabilities, and, upon determining that the gaze distance exceeds a threshold, suppress manual control of at least one vehicle component.

19 Claims, 4 Drawing Sheets

(56) References Cited

U.S. PATENT DOCUMENTS

| | | | |
|---|---|---|---|
| 9,662,977 | B2 | 5/2017 | Kapuria et al. |
| 9,682,482 | B2 * | 6/2017 | Ohara ................. B25J 11/0005 |
| 9,881,221 | B2 | 1/2018 | Bala et al. |
| 10,108,190 | B2 * | 10/2018 | Tomatsu ............... B60W 40/08 |
| 10,317,900 | B2 * | 6/2019 | Kamhi ................... G06V 40/19 |
| 10,377,303 | B2 * | 8/2019 | McNew ............ B60W 50/0097 |
| 10,474,158 | B2 * | 11/2019 | Shimakage ..... B60W 30/18154 |
| 10,671,890 | B2 * | 6/2020 | Linden ....................... G06T 7/74 |
| 10,807,605 | B2 * | 10/2020 | Hutchings ............... G06F 3/013 |
| 10,871,823 | B1 * | 12/2020 | Burgess .................. G06T 7/246 |
| 10,896,335 | B2 * | 1/2021 | Herman ............... G06V 40/103 |
| 11,176,637 | B2 * | 11/2021 | Bastani ..................... G06T 1/60 |
| 11,237,554 | B2 * | 2/2022 | Rezaeian ................. G06F 3/013 |
| 11,301,677 | B2 * | 4/2022 | Molin ................... G06K 9/6217 |
| 2017/0329329 | A1 * | 11/2017 | Kamhi ................. G05D 1/0088 |
| 2019/0279009 | A1 | 9/2019 | Srirangam Narashiman et al. |
| 2021/0354703 | A1 * | 11/2021 | Fairgrieve ......... B60W 60/0015 |

OTHER PUBLICATIONS

Naqvi et al., "Deep Learning-Based Gaze Detection System for Automobile Drivers Using a NIR Camera Sensor", Sensors 2018, 18, 456; doi:10.3390/s18020456, www.mdpi.com/journal/sensors.

Reddy et al., "Real-time Driver Drowsiness Detection for Embedded System Using Model Compression of Deep Neural Networks", This CVPR workshop paper is the Open Access version, provided by the Computer Visiion Foundation. Except for this watermark, it is identical to the version available on IEEE Xplore.

Sheng et al., "Real-time Detection of Distracted Driving based on Deep Learning", Article in IET Intelligent Transport Systems, Jul. 2018, DOI: 10.1049/iet-its.2018.5172.

Vora et al., "Driver Gaze Zone Estimation using Convolutional Neural Networks: A General Framework and Ablative Analysis", arXiv:1802.02690v2 [cs.CV] Apr. 25, 2018.

* cited by examiner

VEHICLE OCCUPANT GAZE DETECTION

BACKGROUND

During manual operation of a vehicle, an occupant views a roadway to see objects on the roadway. For example, the occupant can view other vehicles, road signs, lane markings, etc. During autonomous operation of the vehicle, the occupant may look away from the roadway, and a computer in the vehicle may operate the vehicle without input from the occupant. Determining a direction in which the occupant is looking presents a problem for the computer.

DETAILED DESCRIPTION

Figure 1:
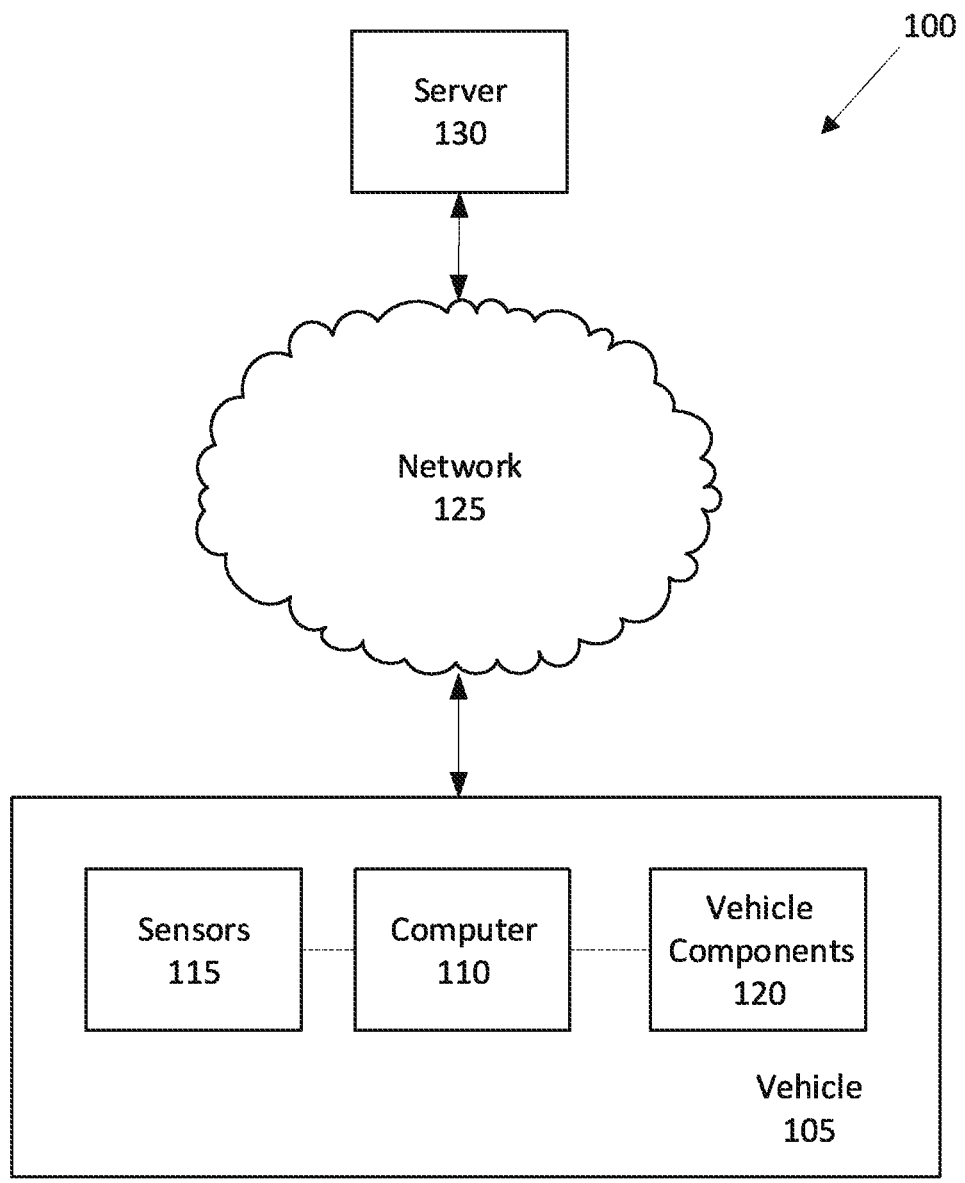
FIG. 1 is a block diagram of an example system for detecting a gaze of an occupant of a vehicle.

A system includes a computer including a processor and a memory, the memory storing instructions executable by the processor to determine respective probabilities of a direction of a gaze of a vehicle occupant toward each of a plurality of points in an image, determine a gaze distance from a center of the image based on the probabilities, and, upon determining that the gaze distance exceeds a threshold, suppress manual control of at least one vehicle component.

The instructions can further include instructions to determine the gaze distance as a distance between the center of the image and a gaze point, the gaze point being a weighted sum of coordinates of each of the plurality of points, each of the plurality of points weighted by the respective probability of the direction of the gaze of the occupant to the respective point.

The center of the image can be an origin of a two-dimensional coordinate system, each of the plurality of points can be a set of coordinates in the two-dimensional coordinate system, and the instructions can further include instructions to determine a set of coordinates of the gaze point as the sum of the respective set of coordinates of each of the plurality of points multiplied by the respective probability of the direction of the gaze of the occupant to the respective points.

The instructions can further include instructions to collect a plurality of images of the occupant, to determine respective gaze distances for each of the plurality of images, and to suppress manual control of the at least one vehicle component upon determining that respective gaze distances of a second plurality of consecutive images exceeds the threshold.

The instructions can further include instructions to allow manual control of the at least one vehicle component upon determining that a gaze distance of a first image exceeds the threshold and a gaze distance of a second image consecutive to the first image is below the threshold.

The instructions can further include instructions to suppress manual control of the at least one vehicle component upon determining that a mean of the gaze distances of the second plurality of consecutive images exceeds the threshold.

The instructions can further include instructions to input the image to a machine learning program trained to output the respective probabilities of the direction of the gaze of the occupant toward each of the plurality of points.

The machine learning program can be trained to identify a plurality of landmarks of a face of the occupant and to output the probabilities of the direction of the gaze of the occupant based on identified landmarks.

The instructions can further include instructions to inscribe a circle in the image, the circle having a center at the center of the image, wherein each of the plurality of points are within a distance threshold of the circle.

The instructions can further include instructions to request input from the occupant upon determining that the gaze distance exceeds a threshold and, upon detecting no input from the occupant, suppress manual control of the at least one vehicle component.

The instructions can further include instructions to transition the vehicle to a fully autonomous mode upon determining that the gaze distance exceeds the threshold.

The instructions can further include instructions to determine the direction of the gaze of the occupant based on detected landmarks of a face of the occupant.

The instructions can further include instructions to suppress manual control of the at least one vehicle component upon determining that the gaze distance exceeds the threshold for an elapsed time exceeding a time threshold.

Each of the plurality of points can be disposed at a respective location in an interior of the vehicle that, when the occupant gazes at the location, the occupant gazes away from a roadway.

A method includes determining respective probabilities of a direction of a gaze of a vehicle occupant toward each of a plurality of points in an image, determining a gaze distance from a center of the image based on the probabilities, and, upon determining that the gaze distance exceeds a threshold, suppressing manual control of at least one vehicle component.

The method can further include determining the gaze distance as a distance between the center of the image and a gaze point, the gaze point being a weighted sum of coordinates of each of the plurality of points, each of the plurality of points weighted by the respective probability of the direction of the gaze of the occupant to the respective point.

The center of the image can be an origin of a two-dimensional coordinate system, each of the plurality of points can be a set of coordinates in the two-dimensional coordinate system, and the method can further include determining a set of coordinates of the gaze point as the sum of the respective set of coordinates of each of the plurality of points multiplied by the respective probability of the direction of the gaze of the occupant to the respective points.

The method can further include collecting a plurality of images of the occupant, determining respective gaze distances for each of the plurality of images, and suppressing manual control of the at least one vehicle component upon determining that respective gaze distances of a second plurality of consecutive images exceeds the threshold.

The method can further include allowing manual control of the at least one vehicle component upon determining that a gaze distance of a first image exceeds the threshold and a gaze distance of a second image consecutive to the first image is below the threshold.

The method can further include suppressing manual control of the at least one vehicle component upon determining that a mean of the gaze distances of the second plurality of consecutive images exceeds the threshold.

The method can further include inputting the image to a machine learning program trained to output the respective probabilities of the direction of the gaze of the occupant toward each of the plurality of points.

The method can further include inscribing a circle in the image, the circle having a center at the center of the image, wherein each of the plurality of points are within a distance threshold of the circle.

The method can further include requesting input from the occupant upon determining that the gaze distance exceeds a threshold and, upon detecting no input from the occupant, suppressing manual control of the at least one vehicle component.

The method can further include transitioning the vehicle to a fully autonomous mode upon determining that the gaze distance exceeds the threshold.

The method can further include determining the direction of the gaze of the occupant based on detected landmarks of a face of the occupant.

The method can further include suppressing manual control of the at least one vehicle component upon determining that the gaze distance exceeds the threshold for an elapsed time exceeding a time threshold.

Further disclosed is a computing device programmed to execute any of the above method steps. Yet further disclosed is a vehicle comprising the computing device. Yet further disclosed is a computer program product, comprising a computer readable medium storing instructions executable by a computer processor, to execute any of the above method steps.

To determine whether an occupant operating a vehicle is looking away from a roadway, a computer can collect image data of the occupant. The computer can identify a gaze direction of the occupant using a machine learning program trained to identify landmarks of a face of the occupant and to output a direction in which the occupant is gazing. The computer can determine the gaze direction based on probabilities that the occupant is gazing at each of a plurality of locations in an image. If the gaze direction indicates that the occupant is looking away from the roadway, e.g., at another location in the vehicle, the computer can transition operation of one or more vehicle components to an autonomous mode. That is, when the image data indicate that the occupant is not looking at the roadway, the computer can autonomously operate the vehicle.

FIG. 1 illustrates an example system 100 for operating a vehicle 105. A computer 110 in the vehicle 105 is programmed to receive collected data from one or more sensors 115. For example, vehicle data may include a location of the vehicle 105, data about an environment around a vehicle, data about an object outside the vehicle such as another vehicle, etc. A vehicle location is typically provided in a conventional form, e.g., geo-coordinates such as latitude and longitude coordinates obtained via a navigation system that uses the Global Positioning System (GPS). Further examples of data can include measurements of vehicle systems and components, e.g., a vehicle velocity, a vehicle trajectory, etc.

The computer 110 is generally programmed for communications on a vehicle network, e.g., including a conventional vehicle communications bus such as a CAN bus, LIN bus, etc., and or other wired and/or wireless technologies, e.g., Ethernet, WIFI, etc. Via the network, bus, and/or other wired or wireless mechanisms (e.g., a wired or wireless local area network in the vehicle 105), the computer 110 may transmit messages to various devices in a vehicle 105 and/or receive messages from the various devices, e.g., controllers, actuators, sensors, etc., including sensors 115. Alternatively or additionally, in cases where the computer 110 actually comprises multiple devices, the vehicle network may be used for communications between devices represented as the computer 110 in this disclosure. For example, the computer 110 can be a generic computer with a processor and memory as described above and/or may include a dedicated electronic circuit including an ASIC that is manufactured for a particular operation, e.g., an ASIC for processing sensor data and/or communicating the sensor data. In another example, the computer 110 may include an FPGA (Field-Programmable Gate Array) which is an integrated circuit manufactured to be configurable by a user. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g. stored in a memory electrically connected to the FPGA circuit. In some examples, a combination of processor(s), ASIC(s), and/or FPGA circuits may be included in computer 110.

In addition, the computer 110 may be programmed for communicating with the network 125, which, as described below, may include various wired and/or wireless networking technologies, e.g., cellular, Bluetooth®, Bluetooth® Low Energy (BLE), wired and/or wireless packet networks, etc.

The memory can be of any type, e.g., hard disk drives, solid state drives, servers, or any volatile or non-volatile media. The memory can store the collected data sent from the sensors 115. The memory can be a separate device from the computer 110, and the computer 110 can retrieve information stored by the memory via a network in the vehicle 105, e.g., over a CAN bus, a wireless network, etc. Alternatively or additionally, the memory can be part of the computer 110, e.g., as a memory of the computer 110.

Sensors 115 can include a variety of devices. For example, various controllers in a vehicle 105 may operate as sensors 115 to provide data via the vehicle network or bus, e.g., data relating to vehicle speed, acceleration, location, subsystem and/or component status, etc. Further, other sensors 115 could include cameras, motion detectors, etc., i.e., sensors 115 to provide data for evaluating a position of a component, evaluating a slope of a roadway, etc. The sensors 115 could, without limitation, also include short range radar, long range radar, LIDAR, and/or ultrasonic transducers.

Collected data can include a variety of data collected in a vehicle 105. Examples of collected data are provided above, and moreover, data are generally collected using one or more sensors 115, and may additionally include data calculated therefrom in the computer 110, and/or at the server 130. In general, collected data may include any data that may be gathered by the sensors 115 and/or computed from such data.

The vehicle 105 can include a plurality of vehicle components 120. In this context, each vehicle component 120 includes one or more hardware components adapted to perform a mechanical function or operation—such as moving the vehicle 105, slowing or stopping the vehicle 105, steering the vehicle 105, etc. Non-limiting examples of components 120 include a propulsion component (that includes, e.g., an internal combustion engine and/or an electric motor, etc.), a transmission component, a steering assembly (e.g., that may include one or more of a steering wheel, a steering rack, etc.), a brake component, a park assist component, an adaptive cruise control component, an adaptive steering component, a movable seat, and the like. Components 120 can include computing devices, e.g., electronic control units (ECUs) or the like and/or computing devices such as described above with respect to the computer 110, and that likewise communicate via a vehicle network.

A vehicle 105 can operate in one of a fully autonomous mode, a semiautonomous mode, or a non-autonomous mode. A fully autonomous mode is defined as one in which each of vehicle propulsion (typically via a powertrain including an electric motor and/or internal combustion engine), braking, and steering are controlled by the computer 110, i.e., in "autonomous operation." A semi-autonomous mode is one in which at least one of vehicle propulsion (typically via a powertrain including an electric motor and/or internal combustion engine), braking, and steering are controlled at least partly by the computer 110 in autonomous operation as opposed to a human operator in "manual" control. In a non-autonomous mode, i.e., a manual mode, the vehicle propulsion, braking, and steering are controlled by the human operator.

The system 100 can further include a network 125 connected to a server 130. The computer 110 can further be programmed to communicate with one or more remote sites such as the server 130, via the network 125, such remote site possibly including a processor and a memory. The network 125 represents one or more mechanisms by which a vehicle computer 110 may communicate with a remote server 130. Accordingly, the network 125 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) such as Dedicated Short Range Communications (DSRC), etc.), local area networks (LAN) and/or wide area networks (WAN), including the Internet, providing data communication services.

Figure 2:
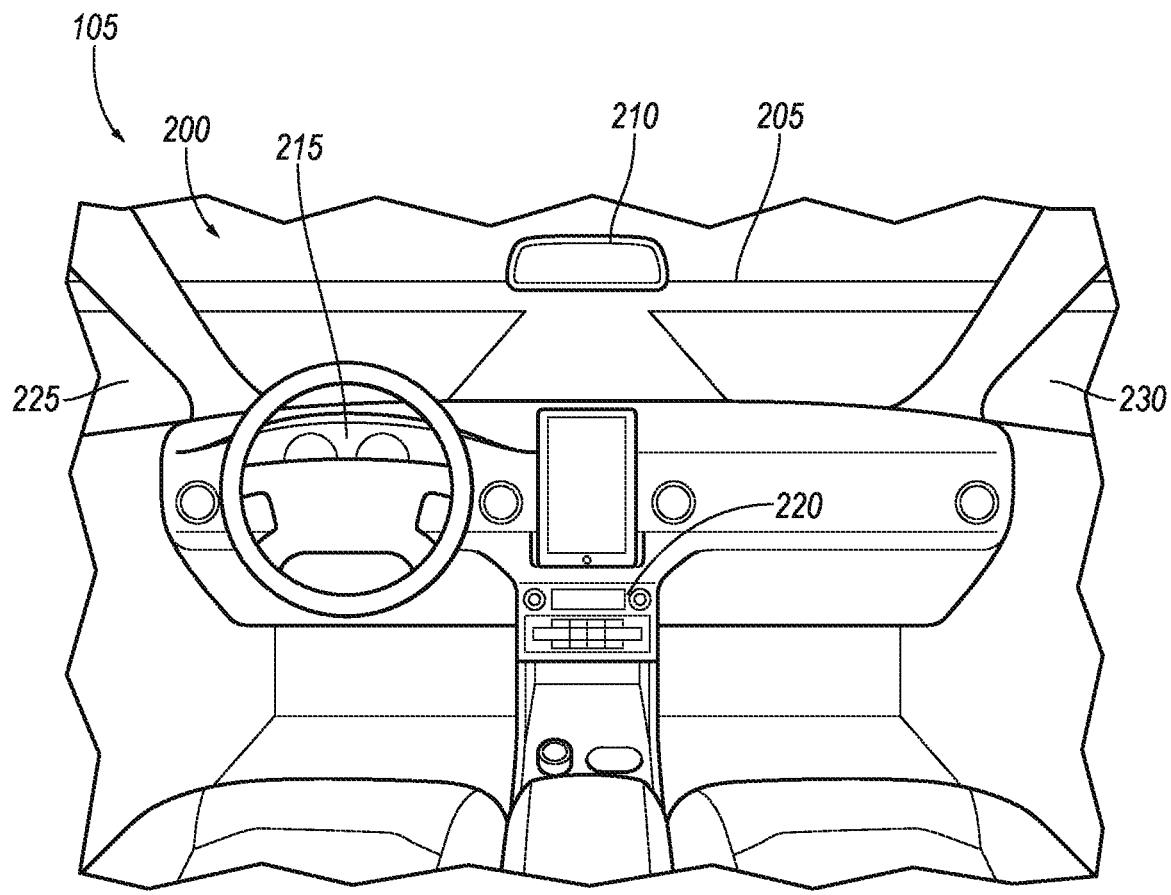
FIG. 2 is a view of an interior of the vehicle.

FIG. 2 is a view of an interior 200 of a vehicle 105. The "interior" 200 of the vehicle 105 is the portion of the vehicle 105 within a body of the vehicle 105. That is, the interior 200 of the vehicle 105 is enclosed by the body, doors, windows, etc. FIG. 2 shows a passenger cabin of the vehicle 105, i.e., a portion of the interior 200 of the vehicle 105 that houses occupants. An occupant can sit in the interior 200 of the vehicle 105 to operate the vehicle 105. As the occupant operates the vehicle 105, the occupant looks through a windshield to view a roadway 205. To operate the vehicle 105 in a manual mode or a semiautonomous mode, the occupant should maintain their view on the roadway 205. When the occupant looks away from the roadway 205, the computer 110 can transition operation of the one or more components 120 of the vehicle 105 to autonomous operation. For example, the computer 110 can operate the vehicle 105 in a fully autonomous mode, as described above.

The interior 200 of the vehicle 105 can include a plurality of locations, non-limiting examples of which are provided below, toward which the occupant can look. The computer 110 can determine whether the occupant is looking towards, i.e., at, one of the locations and, based on the identified location, the computer 110 can transition one or more components 120 of the vehicle 105 to autonomous operation. That is, when the occupant looks at certain locations, the occupant can look away from the roadway 205.

The locations include the roadway 205. When the occupant looks at the roadway 205, the occupant can operate the vehicle 105 in the manual mode or the semiautonomous mode. That is, when the occupant looks at the roadway 205, the occupant can view objects in the roadway 205 that can affect operation of the vehicle 105. For example, the occupant can view a target vehicle approaching the vehicle 105, and the occupant can actuate a brake and/or rotate a steering wheel to avoid the target vehicle.

The locations can include a rearview mirror 210. The rearview mirror 210 reflects light passing through a rear window of the vehicle 105. That is, when the occupant looks at the rearview mirror 210, the occupant can see objects behind the vehicle 105. When the occupant looks at the rearview mirror 210, the occupant may look away from the roadway 205.

The locations can include an instrument panel 215. The instrument panel 215 displays information about vehicle components 120 and operation. For example, the instrument panel 215 can display a current vehicle 105 speed. In another example, the instrument panel can display an amount of fuel in a fuel tank of the vehicle 105. When the occupant looks at the instrument panel 215, the occupant may look away from the roadway 205.

The locations can include a center console 220. The center console 220 can include one or more objects with which the occupant can interact. For example, the center console 220 can include a climate control subsystem, and the occupant can provide input to the center console 220 to adjust a temperature of the interior 200 of the vehicle 105. In another example, the center console 220 can include an entertainment subsystem, and the occupant can provide input to the center console 220 to, e.g., adjust a volume of a speaker. When the occupant looks at the center console 220, the occupant may look away from the roadway 205.

The locations can include a first side window 225 and a second side window 230. The first side window 225 and the second side window 230 allow the occupant to view objects on either side of the vehicle 105. That is, the first and second side windows 225, 230 allow the occupant to see laterally relative to forward motion of the vehicle 105. In the example of FIG. 2, the first side window 225 is a driver's side window to the left of the occupant, and the second side window 230 is a passenger's side window to the right of the occupant. When the occupant looks at either of the first side window 225 or the second side window 230, the occupant may look away from the roadway 205.

Figure 3:
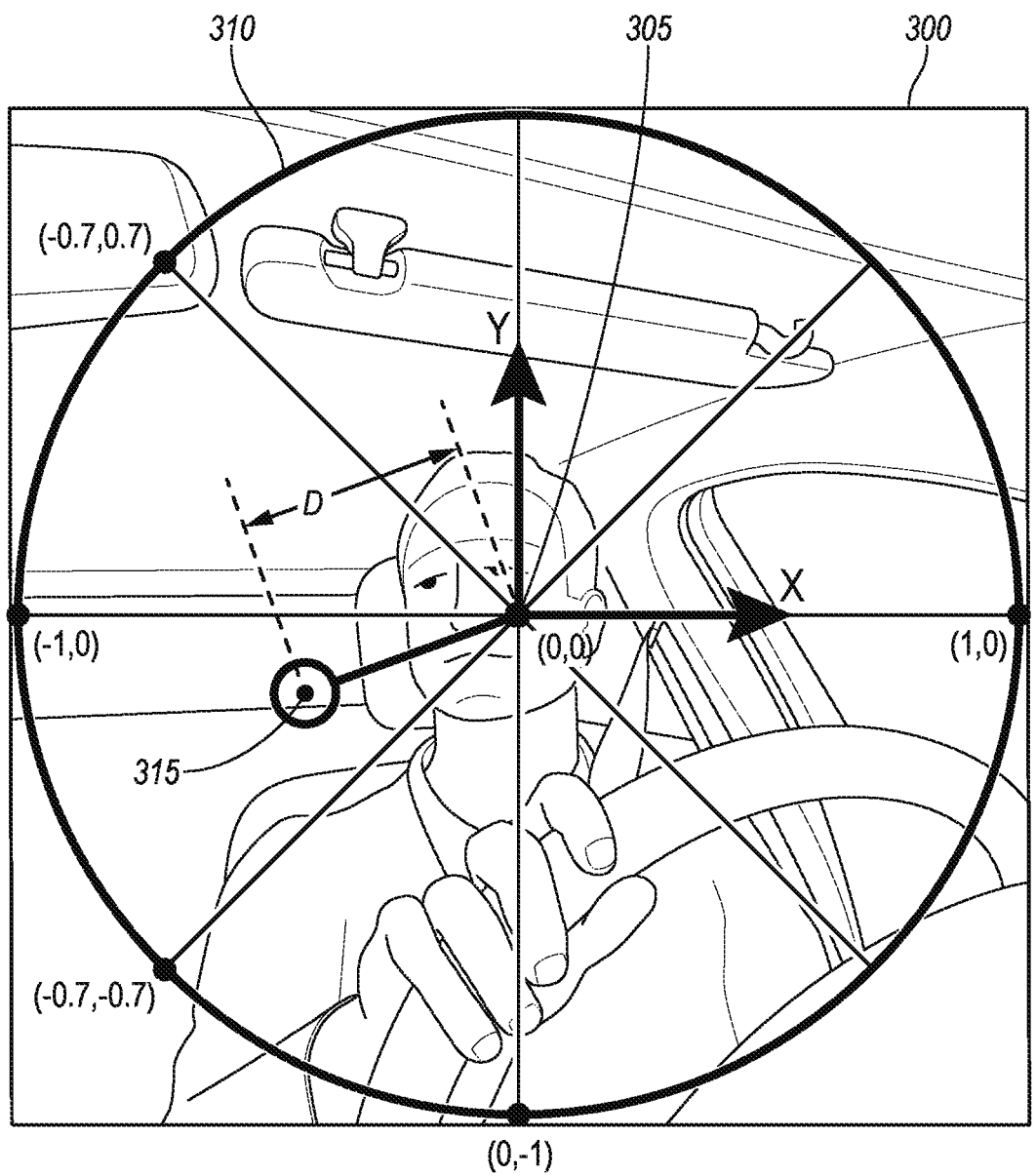
FIG. 3 is a view of the occupant of the vehicle.

FIG. 3 is an example image 300 of the occupant annotated to determine a gaze of the occupant. An image sensor 115 (e.g., a camera) can collect the image 300 of the occupant. The image 300 defines a two-dimensional coordinate system having an origin point 305, a horizontal X axis, and a vertical Y axis. The origin point 305 is a center of the image 300, i.e., a pixel that is farthest from each edge of the image 300. The X, Y axes can extend from the origin point 305. That is, each pixel in the image 300 can be assigned respective values along the X, Y axes. The values can start at (0,0) at the origin point 305. In the example of FIG. 3, the image 300 can include a circle 310 inscribed in the image 300 having a center at the origin point 305 and extending to respective edges of the image 300. The circle 310 has a radius of 1, and the points where the circle 310 intersects with the X, Y axes have respective coordinates of (1,0), (0,1), (−1,0), and (0,−1). That is, the circle 310 is a "unit" circle. Coordinates x, y of any pixel on the circle 310 thus satisfy the equation $x^2+y^2=1$ within a threshold based on the total number of pixels and the size of each pixel. Because the solutions to $x^2+y^2=1$ may result in irrational values for (x,y), the pixels defining the circle 310 can be the pixels having numerical coordinates within a threshold of the irrational solutions of $x^2+y^2=1$. For example, $x=y=\sqrt{2}/2$ defines coordinates $(\sqrt{2}/2,\sqrt{2}/2)$ on the circle 310, and the computer 110 can identify pixels closest to the irrational $\sqrt{2}/2$, e.g., pixels at (0.7,0.7) since $\sqrt{2}/2\approx 0.707$, the threshold being 0.01 in this example.

The computer 110 can identify a gaze of the occupant in the image 300. The "gaze" of the occupant is a line along which the occupant views, i.e., sees or looks at the environment around the occupant. In the image 300, a "gaze point" 315 is a pixel or set of pixels where the gaze of the occupant intersects a plane defined by the image 300. That is, the gaze point 315 indicates a portion of a field of view of the camera 115 that the occupant views. A "gaze direction" is a direction in which the occupant gazes relative to the origin point 305, i.e., the line defining the gaze.

To determine the gaze point 315, the computer 110 can determine a probability that the gaze direction is toward one of the locations described above and shown in FIG. 2. Each location can be represented as coordinates of a point on the unit circle 310. This point is the "location point" for the location. That is, the location point is the point at which the gaze of the occupant looking at the location intersects the circle 310. Thus, when the gaze direction of the occupant is directed toward one of the locations, the gaze point in the image 300 is one of the location points on the circle 310. Thus, when the occupant gazes at one of the location points, the occupant gazes away from the roadway 205. For example, the locations points for the locations described above can be coordinates listed in Table 1:

TABLE 1

| Location Points in Image | |
| --- | --- |
| Location | Location Point |
| Roadway 205 | (0, 0) |
| Rearview Mirror 210 | (−0.7, 0.7) |
| Instrument Panel 215 | (0, −1) |
| Center Console 220 | (−0.7, −0.7) |
| First side window 225 | (1, 0) |
| Second side window 230 | (−1, 0) |

The computer 110 can identify the face of the occupant with a conventional facial recognition machine learning program such as PRNet and Dlib. The facial recognition machine learning program can be trained to output a plurality of landmarks of a face of the occupant from an input image 300. A "landmark" is a point of interest in an image 300 that the machine learning program identifies. For example, the landmarks of a face in an image 300 can be points on the face defining the shape of the face. The machine learning program can be trained on reference images 300 in which the landmarks are annotated. The reference images 300 are input to the machine learning program and a cost function of the machine learning program is reduced until a difference between landmarks output by the machine learning program and the annotated landmarks is below a predetermined threshold. Thus, the computer 110 can output the landmarks of the face of the occupant from an input image 300.

Because the occupant may not gaze directly at one of the locations (i.e., the gaze point 315 is not on the circle 310), the computer 110 can input the landmarks to a conventional gaze-tracking or gaze-classification program such as Point-Net to determine respective probabilities that the gaze direction of the occupant is toward each location. That is, upon identifying the landmarks from the facial recognition machine learning program, the computer 110 can input the image 300 with the identified landmarks to the gaze-tracking program. The gaze-tracking program can be a deep learning program that outputs respective probabilities that the gaze direction is toward each of the location points in the image 300. That is, the gaze-tracking program uses three-dimensional object part segmentation to assign classifications to objects in the image 300 and, based on the classifications, determine a probability that the landmarks indicate that the gaze direction is toward each location point. The gaze-tracking program can be trained by inputting references images 300 with annotated landmarks and annotated probabilities for each location point and reducing a cost function until a difference between the output probabilities and the annotated probabilities is below a predetermined threshold. The computer 110 can thus determine a respective probability that the occupant is gazing at each location.

The computer 110 can determine a gaze distance D from the origin point 305 of the image 300 based on the probabilities. The "gaze distance" is a Euclidean distance from the gaze point 315 to the origin point 305 of the image 300. That is, the gaze distance D can be a weighted sum of coordinates of each of the plurality of location points, each location point weighted by its respective probability of the direction of the gaze of the occupant to the location point:

$$(G_x, G_y) = \sum_i p_i \cdot (x_i, y_i) \quad (1)$$

$$D = \sqrt{G_x^2 + G_y^2} \quad (2)$$

where D is the gaze distance, $(G_x, G_y)$ are the respective x, y coordinates of the gaze point 315, and $p_i$ is the probability that the occupant is gazing at the location $x_i$, $y_i$. That is, the gaze distance D is the Euclidean distance from the origin point 305 to the gaze point 315, the gaze point 315 being the sum of the respective set of coordinates of each of the plurality of points multiplied by the respective probability of the direction of the gaze of the occupant to the respective points.

The computer 110 can suppress manual control of at least one vehicle component 120 upon determining that the gaze distance D exceeds a distance threshold. To "suppress" manual control means to ignore manual input to the component 120 and to only accept input from the computer 110. For example, the computer 110 transition the vehicle 105 to a fully autonomous mode upon determining that the gaze distance D exceeds the threshold or a second threshold. In another example, the computer 110 can transition less than all components 120 to autonomous control. The distance thresholds can be determined based on empirical testing of occupants in test vehicles looking at specific locations and testing reaction times for the occupants to provide input to the components 120 when looking away from the roadway. One of the distance thresholds can be a maximum gaze distance at which the occupant can provide input to the components 120 within a specified period of time, e.g., 2 seconds. Another distance threshold can be a minimum gaze distance at which the occupant cannot provide manual input to the components 120 within the specified period of time. Table 2 shows example component 120 operation and control based on the gaze distance D:

TABLE 2

Control Based on Gaze Distance

| Gaze Distance | Manual Control | Autonomous Control |
|---|---|---|
| $0 < D \leq 0.3$ | Steering, Propulsion, Brake | None |
| $0.3 < D \leq 0.6$ | Brake | Steering, Propulsion |
| $0.6 < D < 1.0$ | None | Steering, Propulsion, Brake |

Alternatively or additionally, prior to suppressing manual control, the computer 110 can request input from the occupant upon determining that the gaze distance D exceeds the threshold. That is, the computer 110 can provide an alert or a message to the occupant requesting input from the occupant. Requesting input from the occupant can help the computer 110 distinguish between momentary glances away from the roadway 205 and the occupant looking at another location in the vehicle 105. The requested input can be, e.g., a voice command, a physical input to a display screen, etc. Upon detecting no input from the occupant, the computer 110 can suppress manual control.

The computer 110 can collect a plurality of images of the occupant and determine respective gaze distances D of the occupant for each of the plurality of images. By determining a plurality of gaze distances D, the computer 110 can distinguish between momentary glances by the occupant away from the roadway and the occupant gazing at a location other than the roadway. That is, the computer 110 can allow manual control determining that a gaze distance D of a first image 300 exceeds the threshold and a gaze distance D of a second image 300 consecutive to the first image 300 is below the threshold. The computer 110 can suppress manual control of at least one vehicle component 120 upon determining that respective gaze distances D of a plurality of consecutive images 300 exceeds the distance threshold described above.

To distinguish from momentary glances by the occupant, the computer 110 can determine that the occupant is gazing away from the roadway when the gaze distance D exceeds the threshold for an elapsed time exceeding a time threshold. That is, upon determining that the gaze distance D exceeds the threshold, the computer 110 can initiate a timer to measure an elapsed time from detecting the gaze distance D exceeding the threshold. The computer 110 can then suppress manual control upon determining that the elapsed time exceeds the time threshold.

The computer 110 suppress manual control upon determining that a mean $\overline{D}$ of the gaze distances D of a plurality of consecutive images 300 exceeds the distance threshold. As described above, a single image 300 may capture a momentary glance of the occupant away from the roadway, so the computer 110 can determine to suppress manual control based on a mean value $\overline{D}$ of a plurality of gaze distances D. The "mean" of the gaze distances D is the arithmetic average of respective gaze distances D of a plurality of consecutive images 300. That is, the computer 110 can select a number of consecutive images 300 and determine the mean $\overline{D}$ of the gaze distances D of the images 300. For example, the computer 110 can determine the mean $\overline{D}$ of the gaze distances D of three consecutive images 300, and the computer 110 can determine the mean $\overline{D}$ of a different number of images 300, e.g., four, five, etc. An example of the mean gaze distance $\overline{D}$ for a plurality of consecutive images 300 can be, e.g.:

$$\overline{D} = \sum_{i=j}^{j+2} D_i \qquad (3)$$

$$j \in [1, n-2]$$

where j is an index indicating one of the set of n images and $\overline{D}$ is the mean gaze distance of three consecutive images 300.

Figure 4:
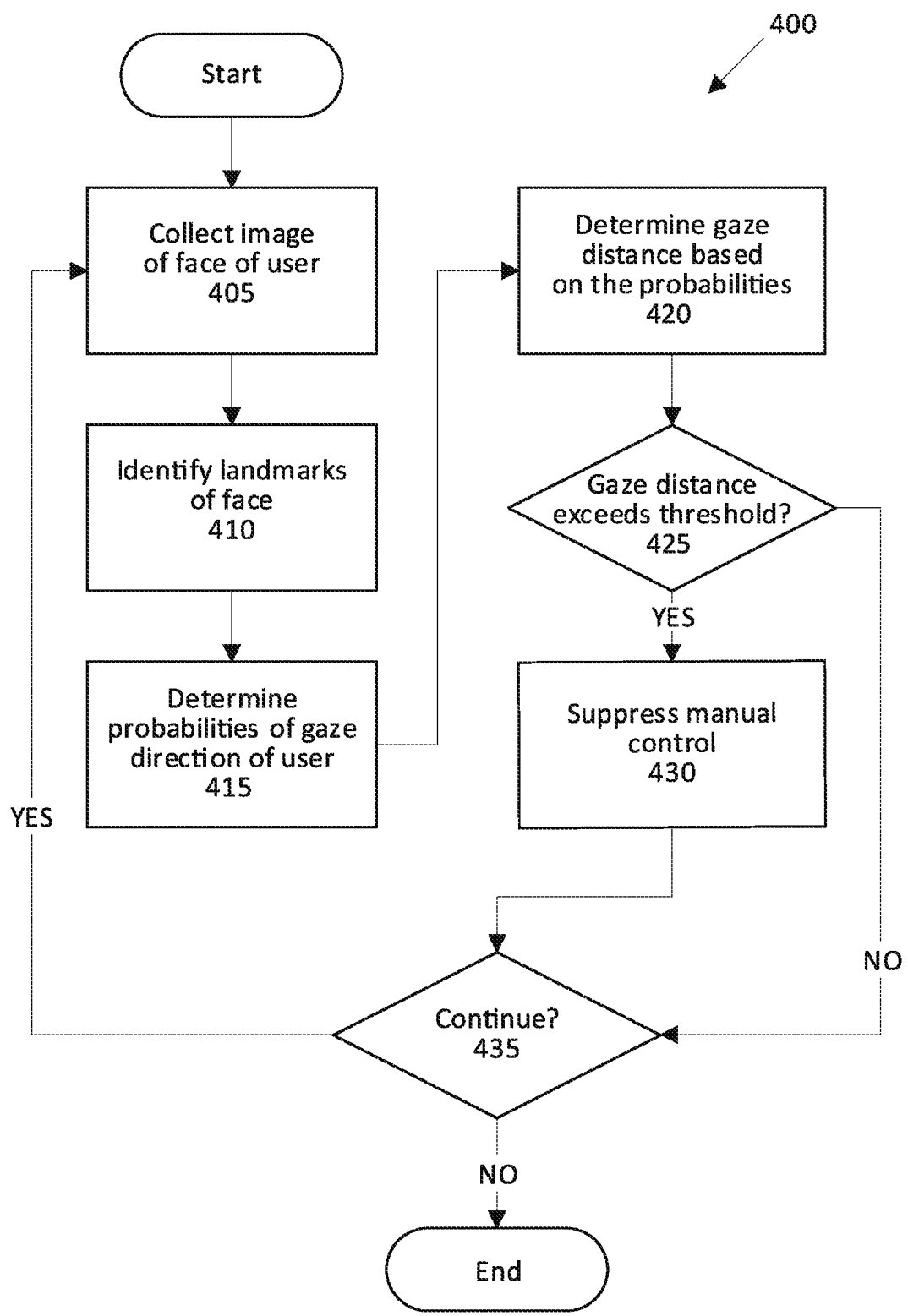
FIG. 4 is a block diagram of an example process for detecting the gaze of the occupant.

FIG. 4 is a diagram of an example process 400 for operating a vehicle 105. The process 400 begins in a block 405, in which a computer 110 instructs a camera 115 to collect an image 300 of an occupant of the vehicle 105. The camera 115 can be positioned in the vehicle 105 to capture a face of the occupant in the image 300.

Next, in a block 410, the computer 110 identifies a plurality of landmarks of the face of the occupant. As described above, the computer 110 can apply a conventional face recognition program such as PRNet and Dlib to identify the landmarks of the face of the occupant. By identifying the landmarks of the face of the occupant, the computer 110 can determine a direction in which the occupant gazes.

Next, in a block 415, the computer 110 determines respective probabilities of a gaze direction of the occupant toward each of a plurality of locations in the vehicle 105. As described above, the occupant can look at a location in the vehicle 105 away from a roadway 205. Each location can be represented as a set of coordinates (x,y) in the image 300. The computer 110 can apply a conventional gaze-tracking program such as PointNet to determine a respective probability that the occupant is gazing at each location.

Next, in a block 420, the computer 110 determines a gaze distance D based on the probabilities. As described above, the gaze distance can be a distance between an origin point 305 of the image 300 and a gaze point 315. The gaze point 315 can be a set of coordinates in the image 300 at which the occupant is gazing. The computer 110 can determine the gaze point 315 as a sum of the coordinates of each location multiplied by the respective probability that the occupant is gazing at the location, as described above.

Next, in a block 425, the computer 110 determines whether the gaze distance D exceeds a distance threshold. As described above, the distance threshold can be a gaze distance D below which the occupant can provide manual control to the components 120 within a specified period of time, e.g. 2 seconds. If the gaze distance exceeds the distance threshold, the process 400 continues in a block 430. Otherwise, the process 400 continues in a block 435.

In the block 430, the computer 110 suppresses manual control of at least one vehicle component 120. That is, the computer 110 operates the component 120 in an autonomous mode and ignores input from the occupant. For example, the computer 110 can transition a steering subsystem to autonomous control. In another example, the computer 110 can operate the vehicle 105 in a fully autonomous mode.

In the block 435, the computer 110 determines whether to continue the process 400. For example, the computer 110 can determine to continue the process 400 when the vehicle 105 is still on a route toward a destination. If the computer 110 determines to continue, the process 400 returns to the block 405. Otherwise, the process 400 ends.

Computing devices discussed herein, including the computer 110, include processors and memories, the memories generally each including instructions executable by one or more computing devices such as those identified above, and for carrying out blocks or steps of processes described above. Computer executable instructions may be compiled or interpreted from computer programs created using a variety of programming languages and/or technologies, including, without limitation, and either alone or in combination, Java™, C, C++, Visual Basic, Java Script, Python, Perl, HTML, etc. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in the computer 110 is generally a collection of data stored on a computer readable medium, such as a storage medium, a random access memory, etc.

A computer readable medium includes any medium that participates in providing data (e.g., instructions), which may be read by a computer. Such a medium may take many forms, including, but not limited to, non volatile media, volatile media, etc. Non volatile media include, for example, optical or magnetic disks and other persistent memory. Volatile media include dynamic random access memory (DRAM), which typically constitutes a main memory. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. For example, in the process 400, one or more of the steps could be omitted, or the steps could be executed in a different order than shown in FIG. 4. In other words, the descriptions of systems and/or processes herein are provided for the purpose of illustrating certain embodiments and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The article "a" modifying a noun should be understood as meaning one or more unless stated otherwise, or context requires otherwise. The phrase "based on" encompasses being partly or entirely based on.

The invention claimed is:

1. A system, comprising a computer including a processor and a memory, the memory storing instructions executable by the processor to:
   determine respective probabilities of a direction of a gaze of a vehicle occupant toward each of a plurality of points in an image including by inputting the image to a machine learning program trained to output the respective probabilities of the direction of the gaze of the occupant toward each of the plurality of points;
   determine a gaze distance from a center of the image based on the probabilities; and
   upon determining that the gaze distance exceeds a threshold, suppress manual control of at least one vehicle component.

2. The system of claim 1, wherein the instructions further include instructions to determine the gaze distance as a distance between the center of the image and a gaze point, the gaze point being a weighted sum of coordinates of each of the plurality of points, each of the plurality of points weighted by the respective probability of the direction of the gaze of the occupant to the respective point.

3. The system of claim 2, wherein the center of the image is an origin of a two-dimensional coordinate system, each of the plurality of points is a set of coordinates in the two-dimensional coordinate system, and the instructions further include instructions to determine a set of coordinates of the gaze point as the sum of the respective set of coordinates of each of the plurality of points multiplied by the respective probability of the direction of the gaze of the occupant to the respective points.

4. The system of claim 1, wherein the instructions further include instructions to collect a plurality of images of the occupant, to determine respective gaze distances for each of the plurality of images, and to suppress manual control of the at least one vehicle component upon determining that respective gaze distances of a second plurality of consecutive images exceeds the threshold.

5. The system of claim 4, wherein the instructions further include instructions to allow manual control of the at least one vehicle component upon determining that a gaze distance of a first image exceeds the threshold and a gaze distance of a second image consecutive to the first image is below the threshold.

6. The system of claim 4, wherein the instructions further include instructions to suppress manual control of the at least one vehicle component upon determining that a mean of the gaze distances of the second plurality of consecutive images exceeds the threshold.

7. The system of claim 1, wherein the machine learning program is trained to identify a plurality of landmarks of a face of the occupant and to output the probabilities of the direction of the gaze of the occupant based on identified landmarks.

8. The system of claim 1, wherein the instructions further include instructions to inscribe a circle in the image, the circle having a center at the center of the image, wherein each of the plurality of points are within a distance threshold of the circle.

9. The system of claim 1, wherein the instructions further include instructions to request input from the occupant upon determining that the gaze distance exceeds a threshold and, upon detecting no input from the occupant, suppress manual control of the at least one vehicle component.

10. The system of claim 1, wherein the instructions further include instructions to transition the vehicle to a fully autonomous mode upon determining that the gaze distance exceeds the threshold.

11. The system of claim 1, wherein the instructions further include instructions to determine the direction of the gaze of the occupant based on detected landmarks of a face of the occupant.

12. The system of claim 1, wherein the instructions further include instructions to suppress manual control of the at least one vehicle component upon determining that the gaze distance exceeds the threshold for an elapsed time exceeding a time threshold.

13. The system of claim 1, wherein each of the plurality of points is disposed at a respective location in an interior of the vehicle that, when the occupant gazes at the location, the occupant gazes away from a roadway.

14. A method, comprising:
   determining respective probabilities of a direction of a gaze of a vehicle occupant toward each of a plurality of points in an image, including by inputting the image to a machine learning program trained to output the respective probabilities of the direction of the gaze of the occupant toward each of the plurality of points;
   determining a gaze distance from a center of the image based on the probabilities; and
   upon determining that the gaze distance exceeds a threshold, suppressing manual control of at least one vehicle component.

15. The method of claim 14, further comprising determining the gaze distance as a distance between the center of the image and a gaze point, the gaze point being a weighted sum of coordinates of each of the plurality of points, each of the plurality of points weighted by the respective probability of the direction of the gaze of the occupant to the respective point.

16. The method of claim 15, wherein the center of the image is an origin of a two-dimensional coordinate system, each of the plurality of points is a set of coordinates in the two-dimensional coordinate system, and the method further includes determining a set of coordinates of the gaze point as the sum of the respective set of coordinates of each of the plurality of points multiplied by the respective probability of the direction of the gaze of the occupant to the respective points.

17. The method of claim 14, further comprising collecting a plurality of images of the occupant, determining respective gaze distances for each of the plurality of images, and suppressing manual control of the at least one vehicle component upon determining that respective gaze distances of a second plurality of consecutive images exceeds the threshold.

18. The method of claim 17, further comprising allowing manual control of the at least one vehicle component upon determining that a gaze distance of a first image exceeds the threshold and a gaze distance of a second image consecutive to the first image is below the threshold.

19. The method of claim 17, further comprising suppressing manual control of the at least one vehicle component upon determining that a mean of the gaze distances of the second plurality of consecutive images exceeds the threshold.

* * * * *